Oct. 25, 1938.  LA VERNE R. PHILPOTT ET AL  2,134,530
TRANSLATING APPARATUS
Filed Nov. 27, 1934

WITNESSES:
Fred C. Villson
Hymen Diamond

INVENTOR
LaVerne R. Philpott
Cecil E. Haller
BY
F. W. Lyle
ATTORNEY

Patented Oct. 25, 1938

2,134,530

UNITED STATES PATENT OFFICE 2,134,530

TRANSLATING APPARATUS

La Verne R. Philpott, Washington, D. C., and Cecil E. Haller, Owensboro, Ky., assignors to Westinghouse Electric & Manufacturing Company, East Pittsburgh, Pa., a corporation of Pennsylvania Application November 27, 1934, Serial No. 755,072

7 Claims. (Cl. 175—363)

Our invention relates to translating apparatus and has particular relation to apparatus for controlling the supply of power from an alternating current power source to a load.

It is an object of our invention to provide apparatus for supplying power from a power source to a load in which a plurality of electric discharge devices are incorporated for controlling the supply of power and only one of the discharge devices is to be controlled by external means.

Another object of our invention is to provide apparatus for controlling the supply of power from an alternating current power source to a load by utilizing electric discharge devices that are to be energized during successive half-cycles wherein only one of the devices shall be controlled by external means.

A further object of our invention is to provide a full-wave rectifying system for supplying power from an alternating source to a load wherein controlled rectifiers are utilized and only one of the rectifiers is controlled.

An additional object of our invention is to provide apparatus for supplying power to an inductive load wherein rectifiers incorporating control elements are incorporated for the purpose of controlling the supply of power and only one of the rectifiers is controlled for this purpose.

A more specific object of our invention is to provide apparatus for converting alternating into full wave direct current and for controlling the output direct current by supplying direct-current power to only one of the electric discharge devices that are utilized for rectifying purposes.

According to our invention, we provide a control system incorporating a plurality of grid-controlled electric discharge devices of the hot-cathode gas-filled type or mercury pool devices such as Ignitron tubes. The electric discharge devices are connected to the opposite terminals of an alternating power source, while the load to be supplied is connected to an intermediate terminal of the source and to the junction point of one of the principal electrodes of each of the electric discharge devices. If the electric discharge devices are rectifiers, the above described arrangement will be recognized as the usual full-wave rectifier system.

Only one of the electric discharge devices is controlled in a manner depending on the particular type of device utilized. If the electric discharge device is of the grid-controlled type, control apparatus is provided for the purpose of regulating the phase or magnitude of the potential impressed between the control electrode and one of the principal electrodes. If Ignitron tubes are utilized, the control apparatus is provided for supplying current between the starting electrode and the cathode of one of the tubes in the usual manner. The current transmitted by the Ignitron tubes may be varied by varying the instant in the half cycle of principal potential, impressed on the tube which is controlled, at which the starting current is supplied. The control circuit of another electric discharge device whether it is a grid glow tube or an Ignitron tube is coupled to the principal circuit of the first device preferably through a transformer, and when the current in the first device begins to decay, the second device is energized and in turn supplies current to the load.

The novel features that we consider characteristic of our invention are set forth with particularity in the appended claims. The invention, itself, however, both as to ts organization and its method of operation, together with additional objects and advantages thereof will best be understood from the following description of specific embodiments when read in connection with the accompanying drawing in which:

Figure 1:
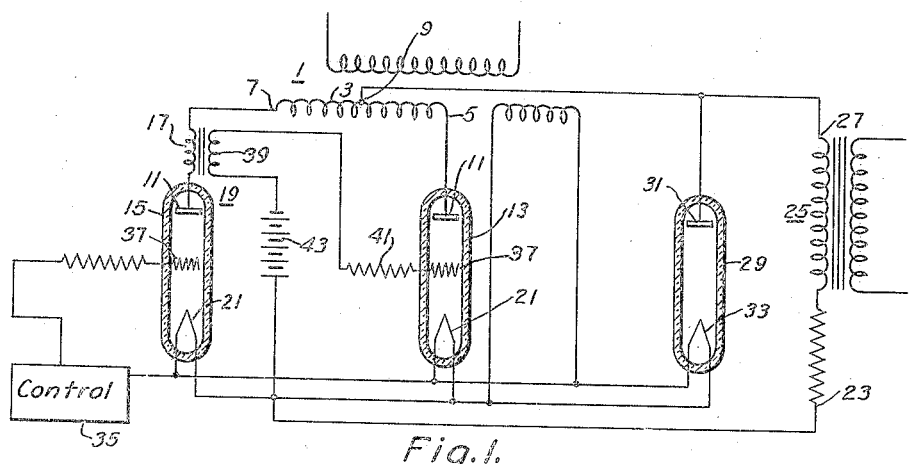
Figure 1 is a diagrammatic view showing the circuit of an embodiment of our invention.

The apparatus shown in Fig. 1 comprises a power supply transformer 1, the secondary 3 of which is provided with a plurality of terminal taps 5 and 7 and an intermediate tap 9. One terminal tap 5 of the secondary 3 is connected to the anode 11 of an electric discharge device 13 of the hot-cathode, gas-filled type. The other terminal 7 of the secondary 3 is connected to the anode 11 of another electric discharge device 15 of the same type through the primary 17 of an auxiliary transformer 19. The cathodes 21 of the electric discharge devices 13 and 15 are connected together and their junction point is connected to one terminal 23 of a load 25 which in the preferred practice of our invention is highly inductive. We have applied our invention particularly to apparatus in which power is controlled by controlling the current in the input winding of a saturable reactor, and accordingly the load 25 may be the input winding of such a reactor.

The remaining terminal 27 of the load 25 is connected to the intermediate tap 9 of the secondary 3 of the power-supply transformer 1 and when the electric discharge devices 13 and 15 are energized alternately, full-wave rectifier current is supplied to the load 25. The current thus supplied is rendered substantially uniform by an asymmetric conductor 29, preferably a hot cathode rectifier, the anode 31 of which is connected to the intermediate tap 9 of the secondary 3 and the cathode 33 of which is connected to the cathodes 21 of the other electric discharge devices 13 and 15.

A control system 35 of the usual type is provided to supply control potential between the control electrode 37 and the cathode 21 of the electric discharge device 15 in the principal circuit of which the primary 17 of the auxiliary transformer 19 is connected. The control system may be of the type supplying direct current power for control purposes since only a single electric discharge device is controlled. The potential impressed between the control-electrode 37 and the cathode 21 of the discharge device 15 may be varied by shifting the phase of the control potential thus applied relative to the principal potential supplied between the anode 11 and the cathode, or by varying the magnitude of the potential. In either case, the electric discharge device may be energized at any desired instant in the positive half-cycle of principal potential and current may be supplied to the load 25.

The secondary 39 of the auxiliary transformer 19 is connected between the control electrode 37 and the cathode 21 of the remaining electric discharge device 13 through a current limiting resistor 41 and a battery 43 or other power source provided for the purpose of maintaining the potential of the control electrode negative relative to the cathode. Normally, the last mentioned electric-discharge device 13, is therefore, deenergized. However, if a variation of sufficient magnitude occurs in the current transmitted through the primary 17 of the auxiliary transformer 19 the negative bias potential impressed between the control electrode 37 and the cathode 21 may be sufficiently overcome to energize the discharge device and current may thus be supplied through the device to the load 25. It is to be noted that the principal potential supplied to the first electric discharge devices 15 is in opposite phase to the principal potential supplied to the other discharge device 13. Since the load 25 is of the inductive type, the second discharge device 13 may be energized by the decay of current in the first discharge device 15.

Figure 3:
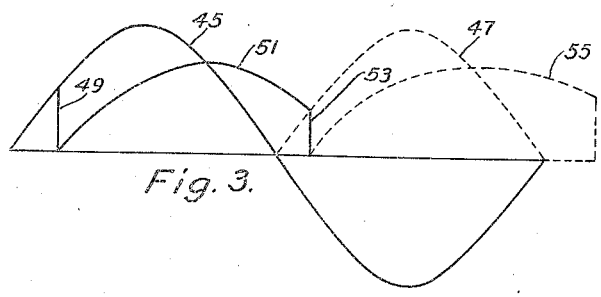
Fig. 3 is a graph illustrating the operation of our invention.

The operation of the system is illustrated in Fig. 3. In this view the principal potential supplied to the first discharge device 15 is represented by a full-line sine curve 45 and a positive half wave of principal potential supplied to the second device 15 is represented by the positive half of a broken-line sine curve 17. The point at which the first device 15 is energized by the control system 35 is represented by a vertical line 49 which cuts the full-line sine curve 45 at a point intermediate the terminals of the positive half wave. The current transmitted by the first device 15 is represented by a full-line curve 51 which rises from zero to a maximum value and then decreases.

By reason of the decrease of the current, an electromotive force is induced in the secondary 39 of the auxiliary transformer 19 and a potential is impressed on the control circuit of the second electric discharge device 13. When, therefore, the positive principal potential of the second electric discharge device 13 rises to a proper value, the latter device is energized as shown and the current transmitted through the first device 15 suddenly drops to zero as represented by the vertical line 53 which cuts the broken line sine curve 47. By reason of the abrupt change in current which thus occurs in the primary 17 of the auxiliary transformer 19, additional potential is now induced in the secondary 39 of the transformer and the potential impressed between the control electrode 37 and the cathode 21 of the second electric discharge device 13 is so increased as to make certain that it will remain in energized condition. The current transmitted by the last mentioned electric discharge device 13 is represented by a broken-line curve 55.

By reason of the abrupt variation in potential which occurs in the control circuit of the second device 13 by the sudden falling off of current in the first device 15, any changes in condition of excitation of the second mentioned electric discharge device which might arise from transition points in its characteristic or from unexpected random ionization conditions in the device are prevented and the continuous supply of current to the load is assured.

Figure 2:
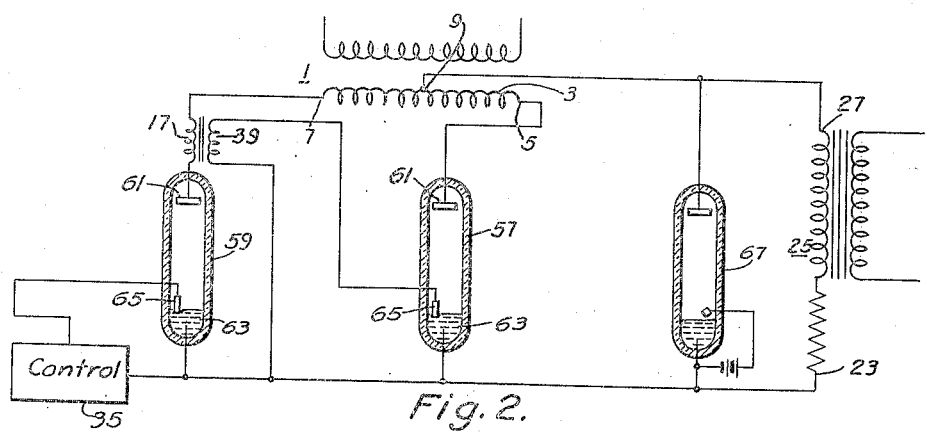
Fig. 2 is a diagrammatic view showing the circuit of a modification of our invention.

In the modification shown in Fig. 2, the hot cathode electric discharge devices 13 and 15 are replaced by Ignitron tubes 57 and 59. Each Ignitron tube incorporates an anode 61, a cathode 63 and a starting electrode 65. The cathode 63 is preferably composed of mercury and the starting electrode 65 is composed of carborundum or other material having a resistivity high compared to the resistivity of the mercury. The discharge between the anode 61 and the cathode 63 is initiated by transmitting a current of predetermined magnitude between the starting electrode 65 and the cathode 63. The starting current for one of the electric discharge devices is provided by the usual control system 35, and the starting current in the second device is provided by inducing the proper potential in the secondary 39 of the auxiliary transformer 19, the primary 17 of which is connected in series with the principal circuit of one device 59 and the secondary 39 of which is connected in series with the starting electrode 65 and the cathode 63 of the other device 61. A rectifier 67 which may also be of the Ignitron tube type is in this modification of our invention connected across the load 25.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In combination, an electric discharge device having a control electrode and a plurality of principal electrodes, means for controlling at will the potential impressed between said control electrode and one of said principal electrodes to control the current transmitted between said principal electrodes, another electric discharge device having a control electrode and a plurality of principal electrodes, an alternating power supply source, means for connecting the principal electrodes of said electric discharge devices to said power supply source in such manner that the principal potential supplied to the first-named one of said devices is in opposite phase relationship to the principal potential supplied to the last-named device, and means for coupling the control electrode and a principal electrode of said last-named device to the output circuit of said first-named device in such manner that the condition of said last-named device is varied in accordance with the output of said first-named device and the decay and abrupt interruption of current in said first-named device tends to maintain said last-named device energized.

2. Apparatus for supplying power to a substantially inductive load comprising an alternating power-supply source, an electric discharge device having a pair of principal electrodes between which a discharge is to pass and a pair of control electrodes between which potentials are to be impressed for controlling said discharge, means for controlling at will the potential impressed between said control electrodes to control said discharge, a second electric discharge device having a pair of principal electrodes between which a discharge is to pass and a pair of control electrodes for controlling the discharge between said principal electrodes, means for connecting the pairs of principal electrodes of each of said devices to said power source in such manner that the potentials impressed between them are in opposite phase to each other and means for coupling the control electrodes of said last-named device to the circuit through which the discharge current of said first-named device passes in such manner that a discharge is initiated in said last-named device by the decay of the discharge in said first-named device.

3. Apparatus for supplying power to a substantially inductive load comprising an alternating power-supply source, an electric discharge device having a pair of principal electrodes between which a discharge is to pass, means for controlling at will the discharge between said principal electrodes, a second electric discharge device having a pair of principal electrodes between which a discharge is to pass and a pair of control electrodes for controlling the discharge between said principal electrodes, means for connecting the pairs of principal electrodes of each of said devices to said power source in such manner that the potentials impressed between them are in opposite phase to each other and means for coupling the control electrodes of said last-named device to the circuit through which the discharge current of said first-named device passes in such manner that a discharge is initiated in said last-named device by the decay of the discharge in said first-named device.

4. Apparatus for controlling the supply of power to a substantially inductive load comprising an alternating power source having a plurality of terminal taps and an intermediate tap, an electric discharge device having a pair of principal electrodes between which a discharge is to pass, means for controlling at will the discharge between said principal electrodes, means for connecting said principal electrodes between one terminal tap of said source and said load, another electric discharge device having a pair of principal electrodes between which a discharge is to pass and a pair of control electrodes for controlling the discharge between said principal electrodes, means for connecting the principal electrodes between another terminal of said power source and said load, means for connecting said load to the intermediate tap of said source and means for coupling the output circuit of said first-named electric discharge device to the control electrodes of said last-named electric discharge device in such manner that a discharge is initiated between the principal electrodes of said last-named electric discharge device by the decay of discharge in said first-named device.

5. Apparatus for controlling the supply of power to a substantially inductive load comprising an alternating power source having a plurality of terminal taps and an intermediate tap, an electric discharge device having a pair of principal electrodes between which a discharge is to pass, means for controlling at will the discharge between the principal electrodes, means for connecting said principal electrodes between one terminal tap of said source and said load, another electric discharge device having a pair of principal electrodes between which a discharge is to pass and a pair of control electrodes for controlling the discharge between said principal electrodes, means for connecting the principal electrodes between another terminal of said power source and said load, means for connecting said load to the intermediate tap of said source and means including a transformer, the primary of which is connected in series with the principal electrodes of said first-named device for coupling the output circuit of said first-named electric discharge device to the control electrodes of said last-named electric discharge device in such manner that a discharge is initiated between the principal electrode of said last-named electric discharge device by the decay of discharge in said first-named device.

6. Apparatus for controlling the supply of power to a load comprising an alternating power source having a plurality of terminal taps and an intermediate tap, an electric discharge device having an anode and a cathode, means for controlling at will the discharge between said anode and cathode, means for connecting said anode to a terminal tap of said source and said cathode to a terminal of said load, another electric discharge device having an anode, a cathode and an element for controlling the discharge between said anode and said cathode, means for connecting another terminal tap of said source to said anode and the last-said terminal of said load to said cathode, means for connecting another terminal of said load to said intermediate tap of said source and means for coupling the circuit through which the discharge current of said first-named device passes between said control element and said cathode of said second-named device in such manner that the discharge in said second-named device is initiated by the decay of a discharge in said first-named device.

7. Apparatus for controlling the supply of power to a load comprising an alternating power source having a plurality of terminal taps and an intermediate tap, an electric discharge device having an anode and a cathode, means for controlling at well the discharge between said anode and cathode, a transformer, means including the primary of said transformer for connecting said anode to a terminal tap of said source and said cathode to a terminal of said load, another electric discharge device having an anode, a cathode and an element for controlling the discharge between said anode and said cathode, means for connecting another terminal tap of said source to said anode and the last-said terminal of said load to said cathode, means for connecting another terminal of said load to said intermediate tap of said source, means including the secondary of said transformer for coupling the circuit through which the discharge current of said first-named device passes between said control element and said cathode of said second-named device in such manner that the discharge in said second-named device is initiated by the decay of discharge in said first-named device and asymmetric conducting means connected across said load in such manner as to absorb the back-electromotive force of said load, whereby the current in said load is maintained substantially uniform.

LA VERNE R. PHILPOTT.
CECIL E. HALLER.